March 22, 1932.    J. J. DROTOS ET AL    1,850,318
BROOM ATTACHMENT
Filed May 4, 1931    2 Sheets-Sheet 1

Inventors
John J. Drotos
R. H. Crawford
By Clarence A. O'Brien
Attorney

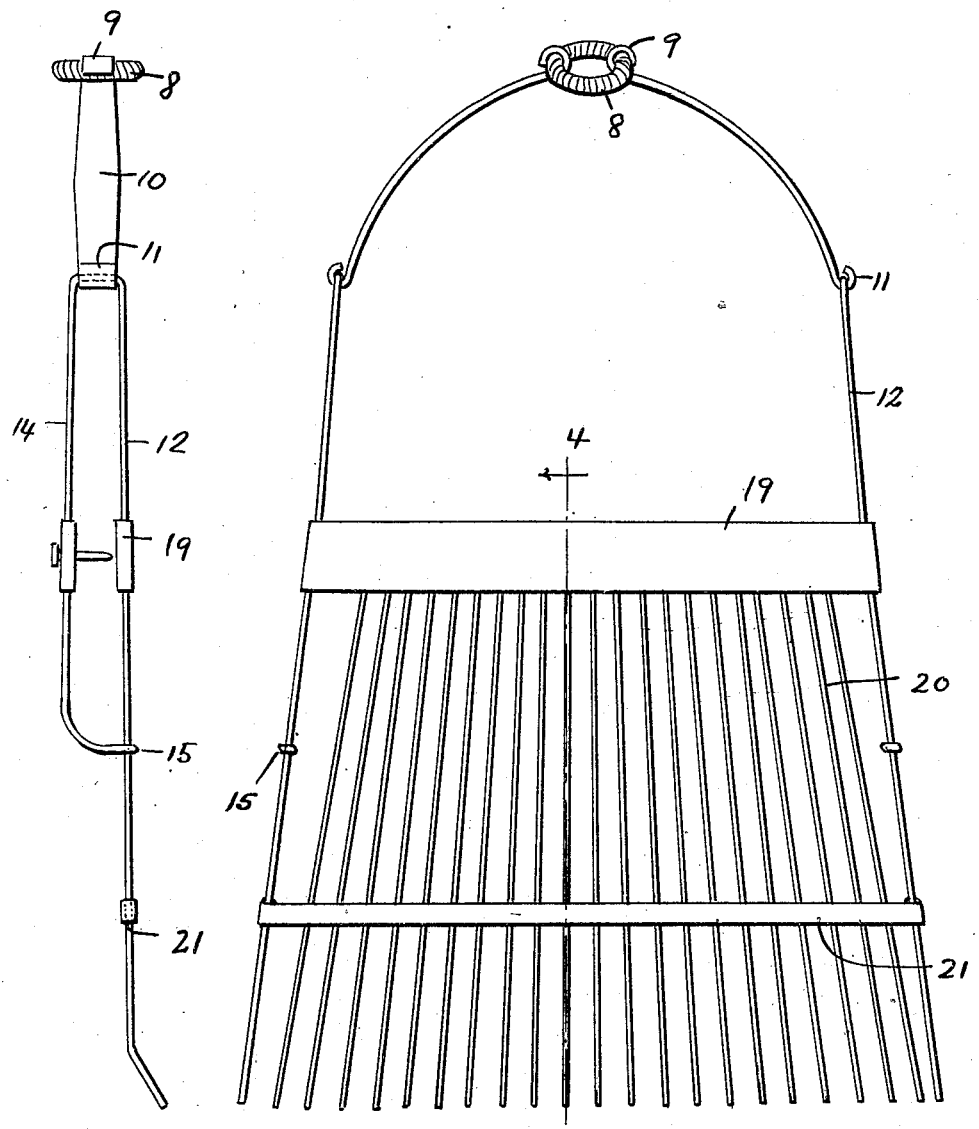

Patented Mar. 22, 1932

1,850,318

UNITED STATES PATENT OFFICE

JOHN J. DROTOS AND ROBERT H. CRAWFORD, OF CLEVELAND, OHIO

BROOM ATTACHMENT

Application filed May 4, 1931. Serial No. 534,994.

The present invention relates to an attachment for brooms in the form of a rake to be attached on to the broom head when the broom is used in sweeping lawns and the like.

An important object of the invention resides in the provision of an attachment of this nature which is exceedingly simple in its construction, inexpensive to manufacture, strong and durable, easy to attach to and detach from the broom, thoroughly efficient and reliable in use and otherwise well adapted to the purpose for which it is designed.

In the drawings:

Figure 2 is a side elevation of the attachment.

Figure 3 is a rear view thereof, and

Figures 1, 4:
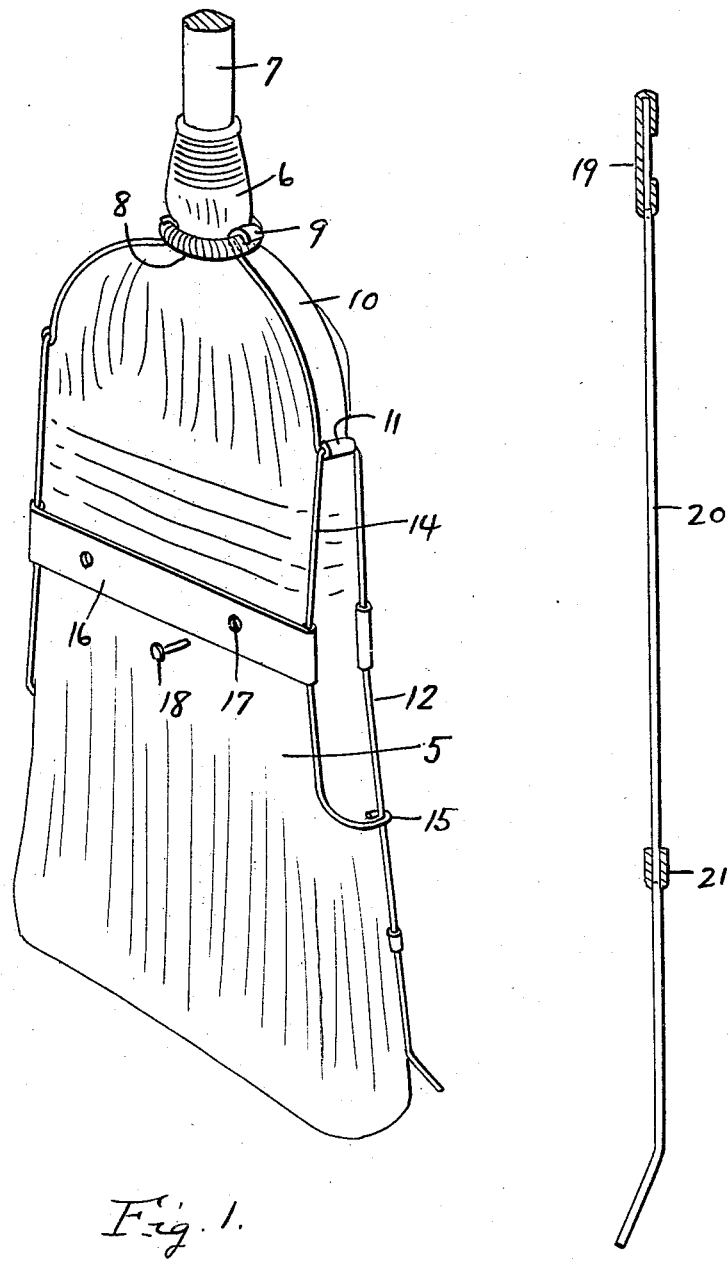
Figure 1 is a perspective view of the broom with the attachment thereon.
Figure 4 is a sectional view therethrough taken substantially on the line 4—4 of Figure 3.

Referring to the drawings in detail it will be seen that the numeral 5 denotes a broom head having a stop portion 6 about a handle 7. This broom structure is conventional.

Numeral 8 denotes a ring disposed about the stop 6 and with which are engaged hooks 9 on the upper end of curved shoulder plates 10, the lower ends of which terminate in sleeves 11. Numerals 12 denote two side turns having upper end portions extended through the sleeves 11 and merging into depending portions 14 the ends of which are curved about intermediate portions of the tines 12 as at 15. A strap 16 is connected to intermediate parts of the portions 14 and has openings 17 so that pins 18 may be inserted therein and driven into the broom head. A strap 19 has ends curved about intermediate upper portions of the side tines 12 so as to be on substantially the same level as the strap 16. A plurality of intermediate tines 20 depend downwardly from the strap 19 and extend through a strap 21 having its ends curved about lower intermediate portions of the side tines 12 below the curved ends 15. The lower ends of the tines 12 and 20 are inclined downwardly away from from the broom head.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. An attachment for a broom head including a pair of side tines having their upper ends bent laterally and merging into depending portions, the ends of which are curved about intermediate portions of the tines, a strap across intermediate parts of the depending portions, a strap across upper intermediate portions of the side tines, a plurality of tines depending from the second mentioned strap and means for securing said side tines to a broom head.

2. An attachment for a broom head including a pair of side tines having their upper ends bent laterally and merging into depending portions, the ends of which are curved about intermediate portions of the tines, a strap across intermediate parts of the depending portions, a strap across upper intermediate portions of the side tines, a plurality of tines depending from the second mentioned strap, a third strap across the lower portion of the side tines through which the other tines extend and means for securing said side tines to a broom head.

3. An attachment for a broom head including a pair of side tines having their upper ends bent laterally and merging into depending portions, the ends of which are curved about intermediate portions of the tines, a strap across intermediate parts of the depending portions, a strap across upper intermediate portions of the side tines, a plurality of tines depending from the second mentioned strap, a third strap across the lower portion of the side tines through which the other tines extend, curved shoulder plates having sleeves disposed about the upper ends of the side tines and terminating at their upper ends in hooks engaged with a ring adapted to be disposed about the stock of the boom head.

In testimony whereof we affix our signatures.

ROBERT H. CRAWFORD.
JOHN J. DROTOS.